United States Patent [19]
Ono

[11] Patent Number: 5,384,819
[45] Date of Patent: Jan. 24, 1995

[54] X-RAY TUBE OF THE ROTARY ANODE TYPE

[75] Inventor: Katsuhiro Ono, Utsunomiya, Japan

[73] Assignee: Kabushiki Kaisha Toshiba, Kawasaki, Japan

[21] Appl. No.: 44,175

[22] Filed: Apr. 8, 1993

[30] Foreign Application Priority Data

Apr. 8, 1992 [JP] Japan .................................. 4-114263

[51] Int. Cl.6 .............................................. H01J 35/10
[52] U.S. Cl. ................................... 378/132; 378/125; 378/133
[58] Field of Search ................. 378/132, 133, 125, 144

[56] References Cited

U.S. PATENT DOCUMENTS

| 3,376,083 | 4/1968 | Everhardus A.M. et al. | |
| 4,210,371 | 7/1980 | Gerkema et al. | |
| 5,181,235 | 1/1993 | Ono et al. | 378/133 |
| 5,189,688 | 2/1993 | Ono et al. | 378/133 |
| 5,195,119 | 3/1993 | Ono et al. | 378/133 |
| 5,204,890 | 4/1993 | Anno et al. | 378/133 |
| 5,210,781 | 5/1993 | Ono et al. | 378/133 X |

FOREIGN PATENT DOCUMENTS

| 60-21463 | 5/1985 | Japan . |
| 60-97536 | 5/1985 | Japan . |
| 60-117531 | 6/1985 | Japan . |
| 62-287555 | 12/1987 | Japan . |
| 63-1811 | 1/1988 | Japan . |
| 1141221 | 6/1989 | Japan . |
| 2227947 | 9/1990 | Japan . |
| 2227948 | 9/1990 | Japan . |

Primary Examiner—David P. Porta
Attorney, Agent, or Firm—Cushman, Darby & Cushman

[57] ABSTRACT

An X-ray tube of the rotary anode type including lubricant passages or lubricant housing recesses formed opening at those areas of a fixed or rotary structure where spiral grooves of slide bearings are present so as to allow lubricant to be more reliably supplied to these grooves-provided areas. Even when the rotary structure starts its rotation or it is being rotated, therefore, the liquid metal lubricant can be more reliably interposed between those faces of the fixed and rotary structures on which the slide bearings are formed. This can prevent the bearings from being damaged and the operation of these bearings can be kept more stable.

10 Claims, 8 Drawing Sheets

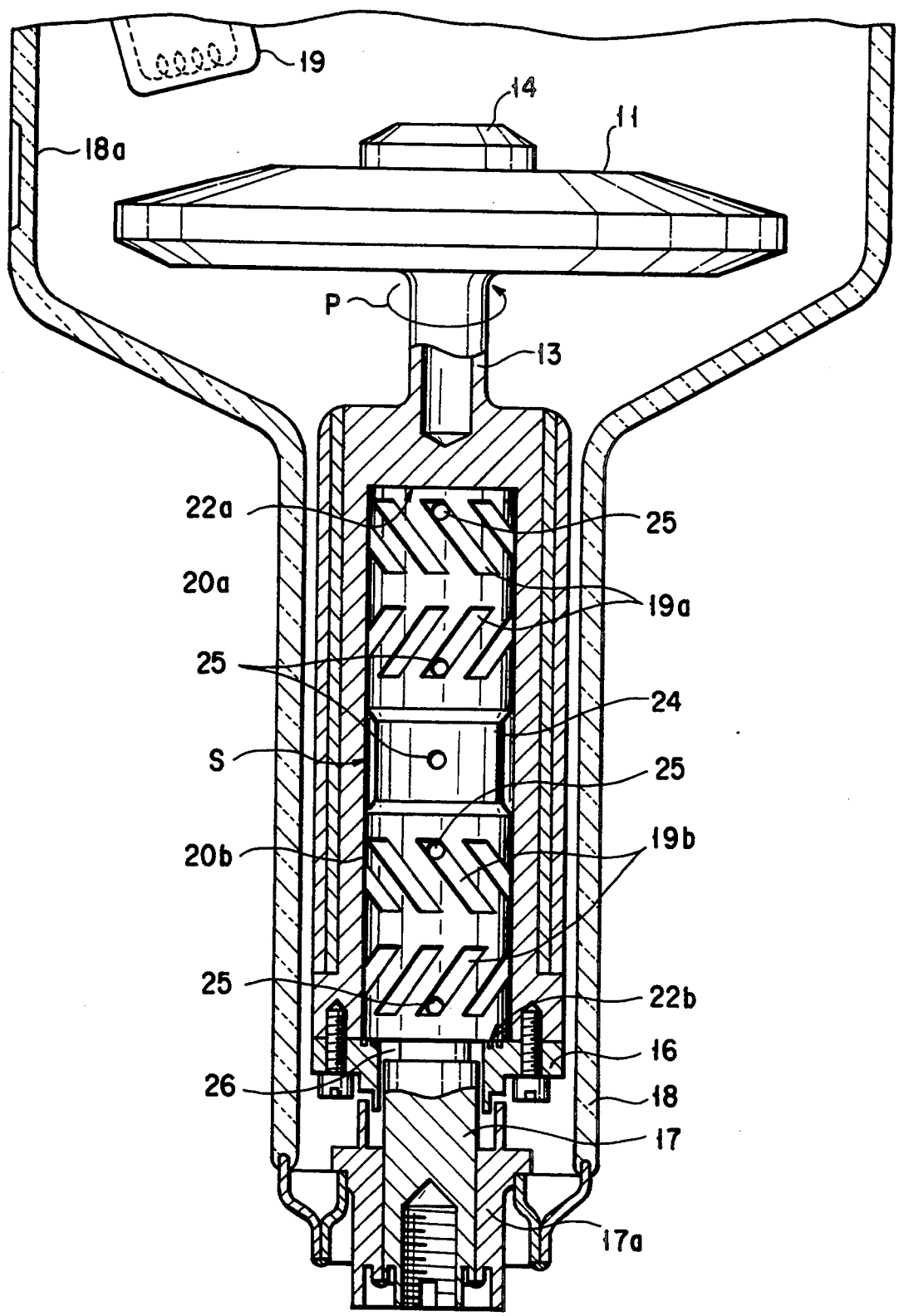
F I G. 2

X-RAY TUBE OF THE ROTARY ANODE TYPE

BACKGROUND OF THE INVENTION

1. Field of the Invention

The present invention relates to an X-ray tube of the rotary anode type and, more particularly, an improvement of bearing components suitable for use with the X-ray tube of the rotary anode type.

2. Description of the Related Art

As well known, in an X-ray tube of the rotary anode type, a disk-like anode target is fixed to a rotary structure which is rotatably supported by a stationary structure and bearings are formed between the stationary and rotary structures. An electron beam is bombarded on the anode target so that X-rays are radiated from the anode target, while exciting electromagnetic coils located outside a vacuum envelope to rotate the rotary structure at high speed. Ball bearings have been used for a long time but it is now expected that bearings of the hydro-dynamic pressure type will become used. In the case of these dynamic pressure type bearings, spiral grooves are formed on the bearing face and liquid metal such as gallium (Ga) and alloy of gallium, indium and tin (Ga-In-Sn) are used as lubricants. Examples in which the dynamic pressure type bearings are used are disclosed in Japanese Patent Publication 60-21463, and Japanese Patent Disclosures 60-97536, 60-117531, 62-287555, 2-227947 and 2-227948, for example.

In the case of the X-ray tube of the rotary anode type in which the above-mentioned liquid metal lubricant is used together with the hydro-dynamic pressure type slide bearings, spiral grooves of the herringbone pattern are used. When the rotary structure is being rotated, the lubricant is collected from the peripheral portion of the herringbone pattern to the center thereof to generate dynamic pressure. Each bearing face is kept apart from its corresponding face of the rotary or stationary structures with an interval of 20 micrometers. That separation is for example, interposed between them while the rotary structure is being rotated. While the rotary structure is stopped, however, a part of the bearing face is contacted with the corresponding face of the fixed or rotary structure because of the weight of the rotary structure. If the lubricant is present, as a thin film, between these contacted faces, the bearing face will not be damaged even when the contacted faces are rubbed against each other at the time of an operation start. When the rotary structure is stopped, however, the lubricant is not sometimes present on that area of the bearing face where the lubricant becomes thinner or less when the X-ray tube is under operation. If no lubricant is present on the bearing face, the contacted faces are rubbed against each other to damage or bake the bearing face when the rotary structure again starts its rotation.

SUMMARY OF THE INVENTION

An object of the present invention is therefore to provide an X-ray tube of the rotary anode type capable of more reliably supplying liquid metal lubricant to slide bearings, even when the rotary structure starts its rotation and it is being rotated, so as to prevent the bearings from being damaged and enable them to be operated with higher stability.

Another object of the present invention is to provide an X-ray tube of the rotary anode type wherein lubricant passages or recesses are formed in the stationary or rotary structure so as to allow lubricant to be more reliably supplied to the slide bearings.

According to the invention, there is provided an X-ray tube of the rotary anode type comprising:
  an anode target;
  rotary structure to which the anode target is fixed, having an center axis and a rotary bearing surface region;
  stationary structure for rotatably supporting rotary structure, having a stationary bearing surface region opposed to the rotary bearing surface region;
  slide bearing sections of hydro-dynamic pressure type, including spiral grooves formed on at least one of the rotary and stationary bearing surface regions and a bearing gap between the rotary and stationary structures;
  a metal lubricant applied to the bearing sections, which is a liquid state when the X-ray tube is stably operated;
  means for receiving the lubricant, including a chamber formed in one of the stationary and rotary structures and at least one lubricant passage formed in the one of stationary and rotary structures and having one end opened in the chamber and the other end opened in one of the rotary and stationary bearing surface regions.

According to the present invention, liquid metal lubricant can be more reliably supplied to the faces of slide bearings even when the rotary structure starts its rotation and it is being rotated. This can prevent the bearing faces from being damaged to enable the slide bearings of the dynamic pressure type to be operated with higher stability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is another vertically-sectioned view showing the rotary anode type X-ray tube in FIG. 1;

DETAILED DESCRIPTION OF THE PREFERRED EMBODIMENTS

Figure 1:
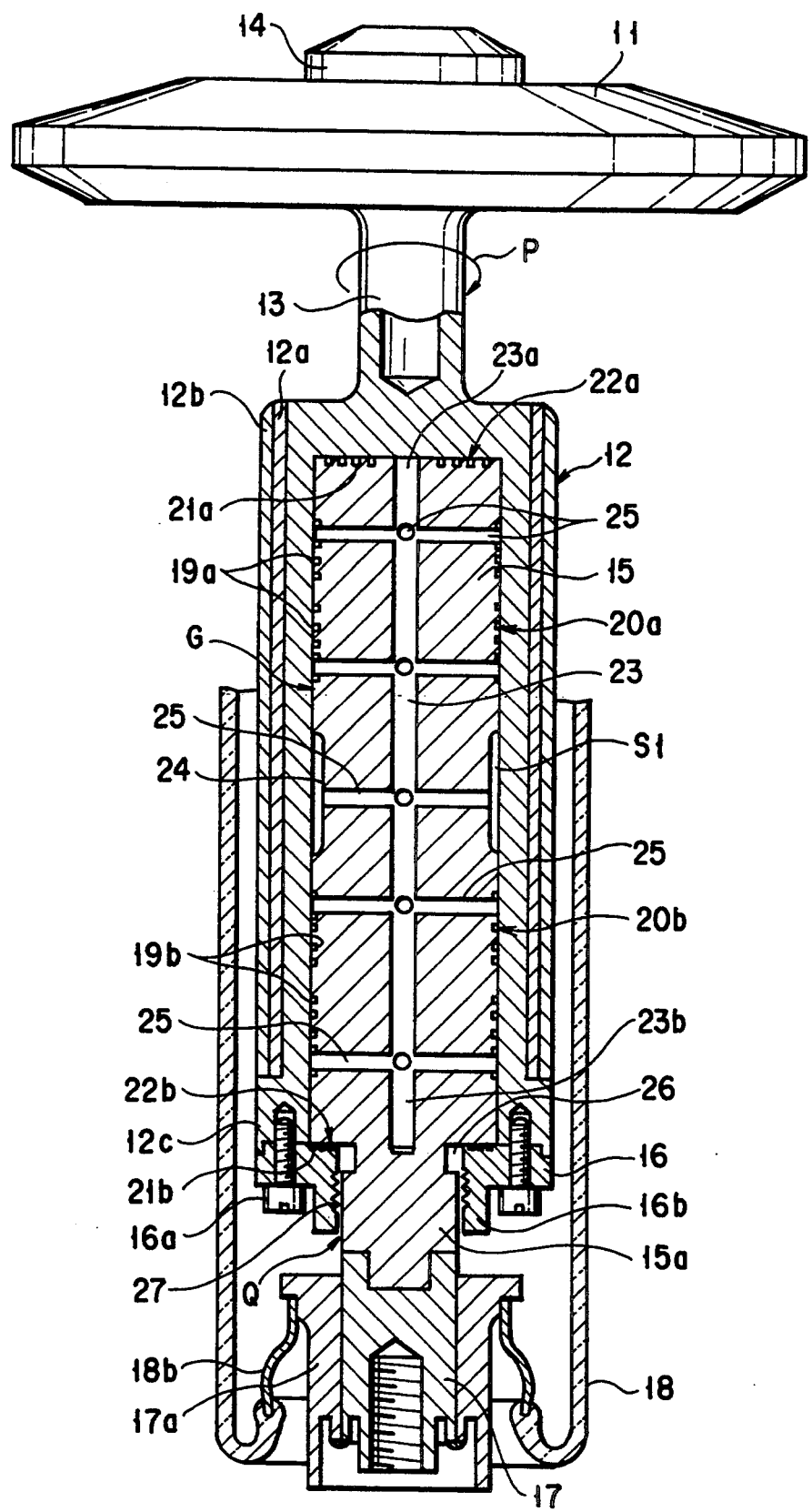
FIG. 1 is a vertically-sectioned view showing the X-ray tube of the rotary anode type according to an embodiment of the present invention.

Some embodiments of the present invention will be described with reference to the accompanying drawings and the same components of these embodiments will be denoted by same reference numerals in the following detailed description.

An X-ray tube of the rotary anode type shown in FIGS. 1 through 4 has the following arrangement. A disk-like anode target 11 made of heavy metal is fixed integral to a rotating shaft 13 by nut 14. The rotating shaft 13 is projected from one end of a bottomed cylindrical rotary structure 12 onto which double rotor cylinders comprising a ferromagnetic cylinder 12a made of iron and a conductive cylinder 12b made of copper are coaxially and fixedly fitted. A column-like stationary structure 15 is fitted into the rotary structure 12. The stationary structure 15 includes a small-diameter portion 15a at its lower end and adjacent to an opening section 12c of the rotary structure 12. A ring-shaped member 16 is fixed to the opening section 12c of the rotary structure 12 by plural bolts 16a enclosing the small-diameter portion 15a of the stationary structure 15 and substantially closing the opening section 12c. An anode support 17 made of iron alloy is soldered to the lower end of the small-diameter portion 15a of the stationary structure to mechanically support the rotary and stationary structures 12 and 15. The anode support 17 is further connected air-tight to a glass vacuum envelope 18 through an auxiliary ring 17a and a seal ring 18b.

Figure 3:
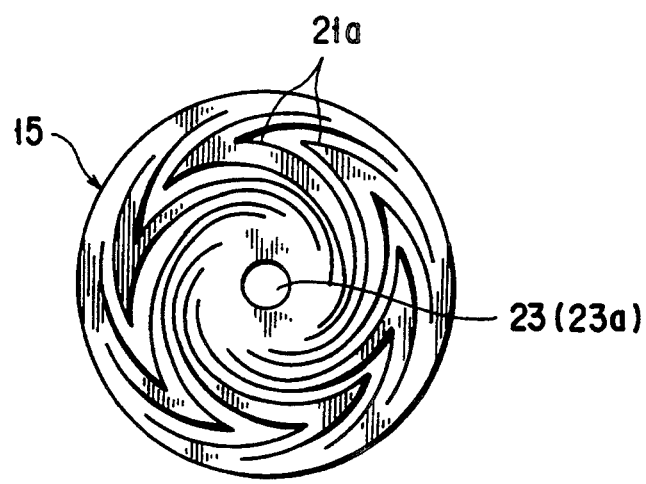
FIG. 3 is a top view showing a main portion of the rotary anode type X-ray tube in FIG. 1.
Figure 4:
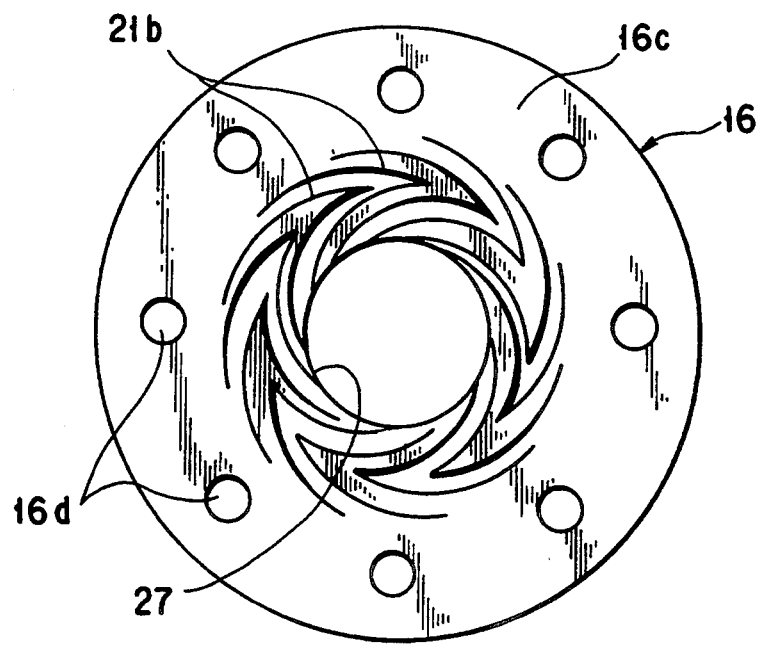
FIG. 4 is a top view showing another main portion of the rotary anode type X-ray tube in FIG. 1.

Such spiral groove slide bearings of the dynamic pressure type as disclosed in the above-mentioned references are provided on that portion of the stationary structure 15 which is fitted into the rotary structure 12. More specifically, herringbone pattern spiral grooves 19a and 19b are formed on the outer circumference of the stationary structure 15 at a certain interval in the axial direction of the structure 15. Two radial slide bearings 20a and 20b are thus formed. Circle-shaped herringbone pattern spiral grooves 21a shown in FIG. 3 are formed on that top end face of the stationary structure 15. One thrust slide bearing 22a is thus formed. Similarly, circle-shaped herringbone pattern spiral grooves 21b shown in FIG. 4 are formed on a top face 16c of the closing member 16. The other thrust slide bearing 22b is thus formed. When being under operation, the rotary and stationary structures 12 and 15 are opposed to each other at their bearings portions with a gap G of about 20 micrometers interposed between them.

A lubricant chamber or hole 23 is formed in the stationary structure 15 along the longitudinal center axis thereof. A top opening 23a of the lubricant chamber 23 is located in the center of the circle-shaped spiral grooves 21a on the top of the stationary structure 15 and communicated with the gap G between the thrust bearing 22a of the stationary structure 15 and that inner face of the rotary structure 12 which is opposed to the thrust bearing 22a. A lower end 23b of the lubricant chamber 23 terminates adjacent to the lower thrust spiral groove slide bearing 22b on the top of the closing member 16. A small-diameter portion 24 is formed on the outer circumference of the stationary structure 15 around the center portion thereof in the axial direction. Groups of passages 25 are formed in the stationary structure 15, each group including five passages extending from the lubricant chamber 23 to the outer circumference of the stationary structure 15 in a radial direction and five openings are formed on the stationary structure 15. That is, the passages 25 are arranged symmetrically to the center axis of the stationary structure 15 with an angle of 90 degrees. Outer ends of the radial passages 25 in the center portion of the stationary structure 15 are opened at the small-diameter portion 24 of the stationary structure 15. Outer ends of those radial passages 25 which are located in the stationary structure 15 at the upper portion thereof are opened at the areas on which the herringbone pattern spiral grooves 19a of the radial slide bearing 20a are formed, more preferably at the areas which are adjacent to the upper and lower ends of the group of grooves 19a. Similarly, outer ends of those radial passages 25 which are located in the stationary structure 15 at the lower portion thereof are opened at the areas of the herringbone pattern spiral grooves 19b of the radial slide bearing 20b, more preferably at the areas which are adjacent to the upper and lower ends of the group of grooves 19b. When the rotary structure is rotated at high speed in a direction shown by an arrow P, liquid metal lubricant supplied to the spiral grooves and the gap G becomes relatively less at those areas at which outer ends of the radial passages 25 are opened. In short, the lubricant which are present in the spiral grooves and the gap G at these areas is collected into center portions of the herringbone pattern spiral grooves. The lubricant becomes thus less at those areas which are adjacent to end rim portions of the grouped grooves. The radial passages 25 extending from the lubricant chamber 23, however, are opened at these areas and this enables the lubricant filled in the lubricant chamber 23 and the radial passages 25 to be quickly supplied to the bearing areas even when the rotary structure 12 starts its rotation and it is being continuously rotated. The lubricant can be thus kept present between the bearing faces of the rotary and stationary structures 12 and 15. Further, the lubricant is also supplied from the lubricant chamber 23 to a ring-shaped space S1, which is formed between the small-diameter portion 24 of the stationary structure 15 and the inner face of the rotary structure 12, through the radial passages 25. This enables the lubricant to be supplied to those portions of the stationary structure 15 on which no spiral groove is formed. Still further, the lubricant can be supplied to the thrust bearing through the opening of the lubricant chamber 23 and those radial passages 25 which are adjacent to the thrust bearing. Therefore, the lubricant can be more reliably supplied to all bearing faces between the rotary and the stationary structures in this manner. In the case of this embodiment, the radial passages 25 are opened into the spiral grooves 19a and 19b. The lubricant which is supplied through the radial passages 25 and entered into the spiral grooves can be thus introduced all over the bearing faces between the grooves. This enables the rotary structure 12 to more smoothly start its rotation.

A ring-shaped space 26 is formed between the closing member 16 and the small-diameter portion of the stationary structure 15 by cutting away a part of the small-diameter portion. A clearance Q is formed between a cylindrical portion 16b of the closing member 16 and the outer circumference of the small-diameter portion 15a and the cylindrical portion 16b has a screw pump groove 27 on its inner face. This screw pump groove 27 and the clearance Q suppress the leakage of the lubricant. The ring-shaped space 26 is sufficiently larger in dimension than the clearance Q in the radial direction of them. The liquid metal lubricant such as Ga alloy is supplied to the spiral grooves on the bearings 20a, 20b, the gas G, the lubricant chamber 23 and the radial passages 25 which are communicated with these grooves, gap G, and the space S1, as described above. The amount of the lubricant thus filled in them is preferably in a range equal to about 20 to 90% of the volume of that inside space through which the lubricant can flow and which includes those in the spiral grooves on the radial and thrust slide bearings, the gap G, the lubricant chamber, the radial passages and the space S1. The lubricant can be thus prevented from leaking and the amount of the lubricant supplied to them can be therefore kept moderate.

Outer ends of the radial passages may be opened at any positions in the grooves-provided area. Some of the radial passages in which the lubricant is not filled serve as passages through which gas flows. Even if gas is produced, its bubbles can be exhausted outside through these radial passages without leading the lubricant together outside.

Figure 5:
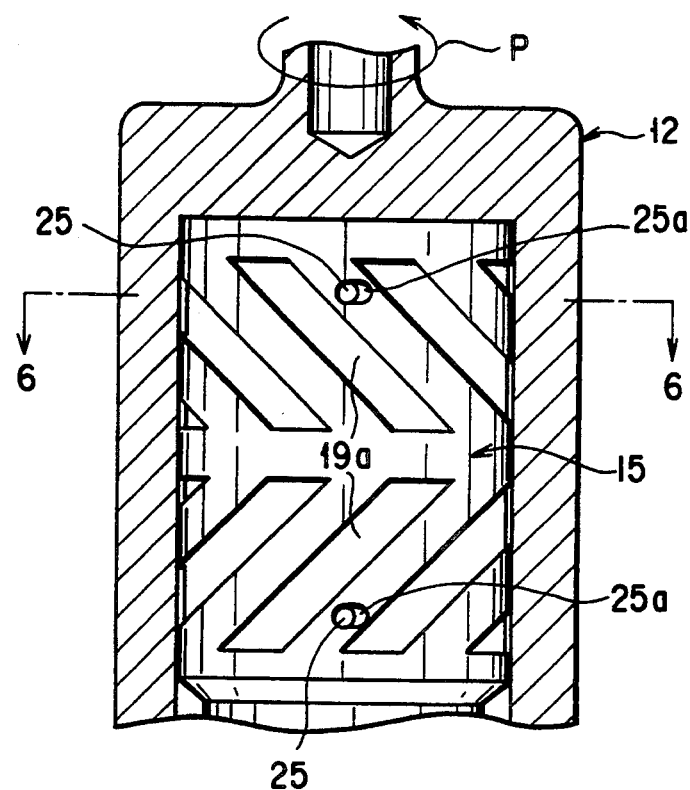
FIG. 5 is a vertically-sectioned view showing the X-ray tube of the rotary anode type according to another embodiment of the present invention.
Figure 6:
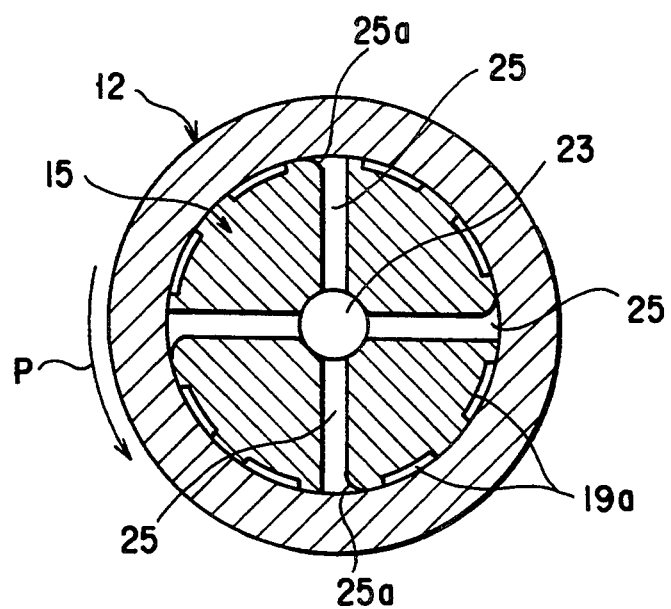
FIG. 6 is a sectional view taken along a line 6—6 in FIG. 5.

In the case of another embodiment shown in FIGS. 5 and 6, each radial passage 25 is opened at the bearing face between adjacent spiral grooves 19a. The open end of each radial passage 25 is tapered in the rotating direction P of the rotary structure 12 to have a tapered opening 25a.

Even when the rotary structure 12 starts its rotation from such a state that its inner face is closely contacted with those bearing faces of the stationary structure 12 at which the radial passages 25 are opened, therefore, the liquid metal lubricant can be reliably supplied to the bearing faces through the tapered openings 25a of the radial passages 25. This enables the rotary structure 12 to more easily start its rotation without damaging the bearing faces of the stationary structure 12.

Figure 7:
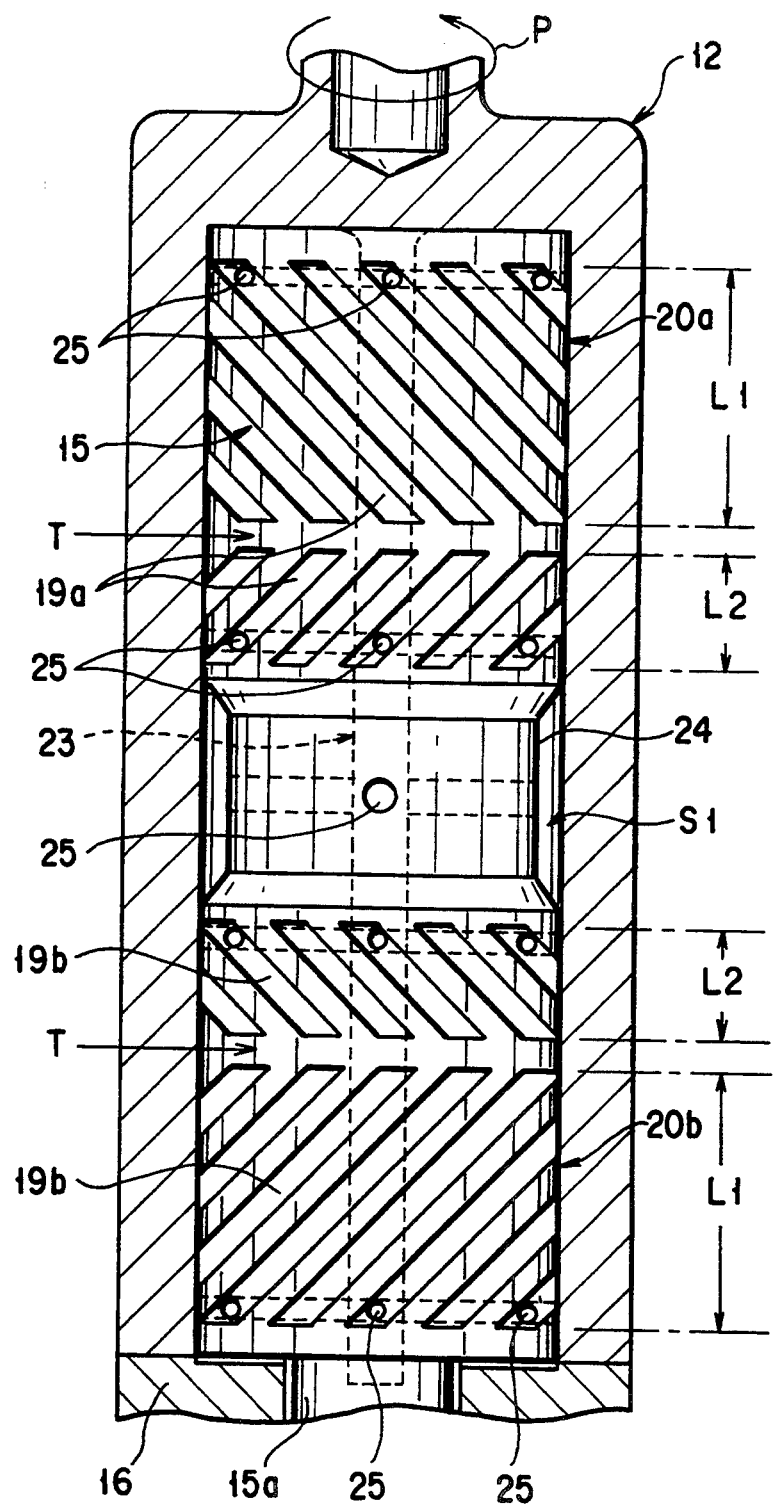
FIG. 7 is a vertically-sectioned view showing the X-ray tube of the rotary anode type according to a further embodiment of the present invention.

In the case of a further embodiment shown in FIG. 7, lengths L1 and L2 of two grouped herringbone pattern spiral grooves 19a or 19b are made different. The plural radial passages 25 are opened adjacent to the outer end of each group of the spiral grooves and they are communicated with the lubricant chamber 23 in the stationary structure 15.

According to this embodiment, the amount of lubricant collected into the long spiral grooves (L1) in a direction T is larger than that of lubricant collected into the short spiral grooves (L2) in the direction T just after the rotary structure 12 is started. A part of the lubricant, therefore, is caused to flow from the lubricant chamber 23 to the openings of the radial passages 25 which are located at the outer area of the group of long spiral grooves. That lubricant is then to those of the radial passages which are located at the outer area of the group of short spiral grooves through their bearing faces, and finally to the lubricant chamber 23. When the rotary structure 12 is being rotated, therefore, a part of the lubricant can be automatically circulated and thus reliable supplied to the bearing areas.

Figure 8:
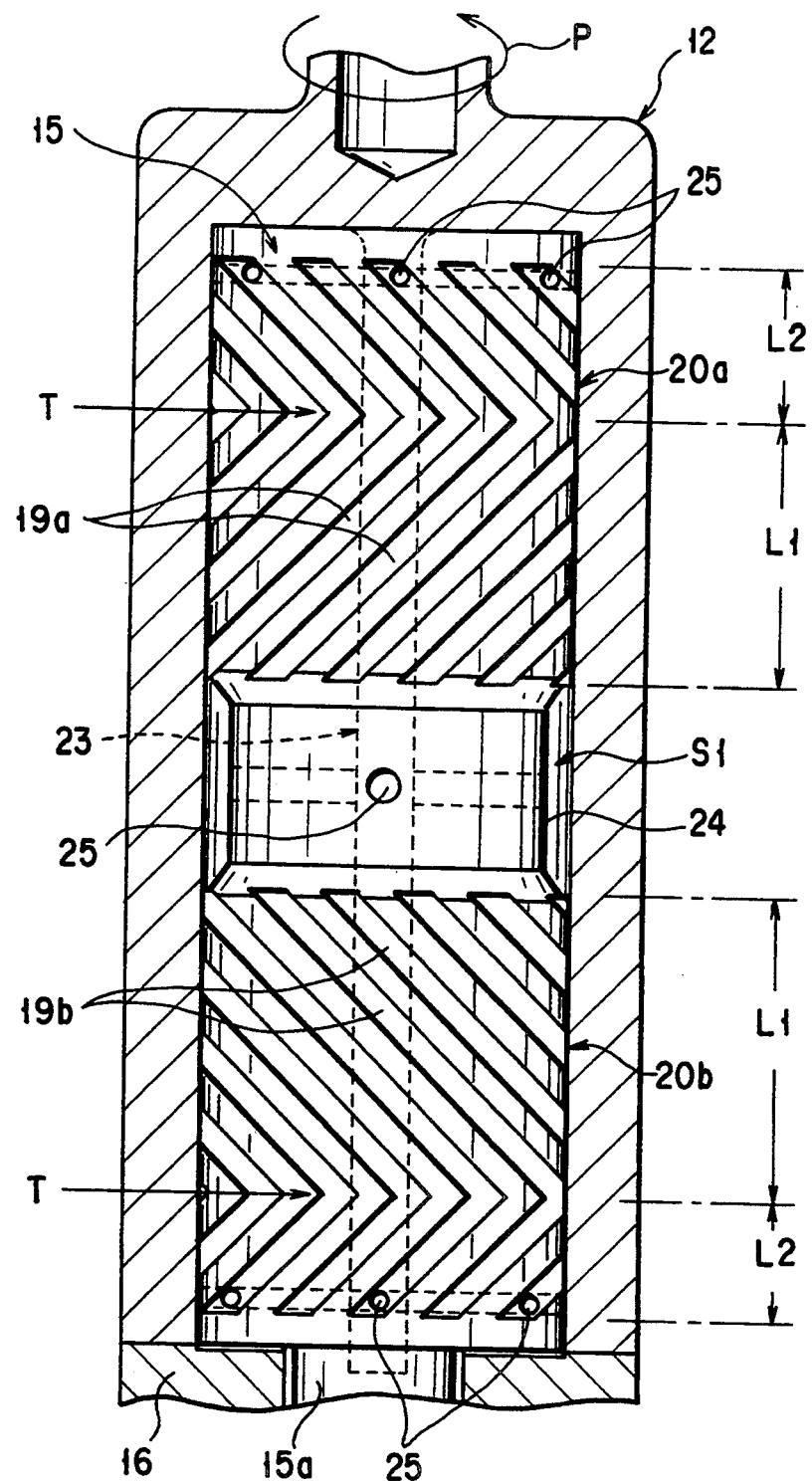
FIG. 8 is a vertically-sectioned view showing the X-ray tube of the rotary anode type according to a still further embodiment of the present invention.

In the case of a still further embodiment shown in FIG. 8, short and long herringbone pattern spiral grooves 19a are connected to each other to form a single groove having an upper short portion and a lower long portion. Similarly, short and long herringbone pattern spiral grooves 19b are also connected to each other to form a single groove having an upper long portion and a lower short portion. The long portions of the grooves 19a and 19b are extend in the small-diameter portion 24 of the stationary structure 15. In other words, the spiral grooves 19a and 19b are communicated with the space S1 formed between the small-diameter portion 24 and the inner face of the rotary structure 12. Further, plural radial passages 25 are opened adjacent to the outer ends of the short portions of the grooves 19a and 19b.

According to this embodiment, the lubricant supplied to the space S1 is caused to pass through the long portions of the grooves 19a and 19b, then through the short portions thereof, and return to the lubricant chamber 23 through those openings of the radial passages 25 which are located adjacent to the outer ends of the short portions of the grooves 19a and 19b. A part of the lubricant can be therefore automatically circulated and reliably supplied to the bearing faces. In addition, the radial passages is not be formed in those areas of the stationary structure 15 where the long portions of the grooves 19a and 19b are located. This makes it easier to make the X-ray tube.

Figure 9:
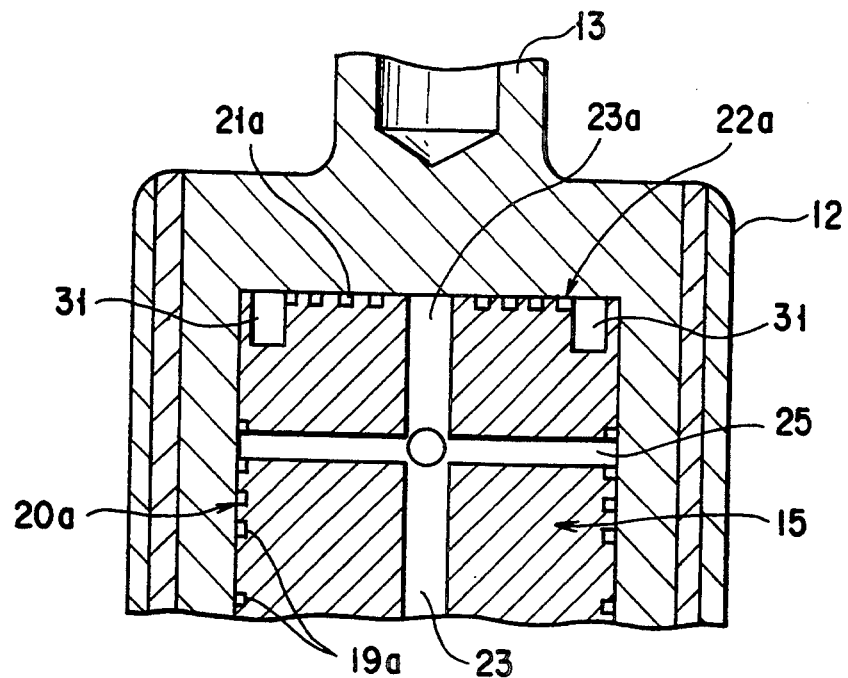
FIG. 9 is a vertically-sectioned view showing the X-ray tube of the rotary anode type according to a still further embodiment of the present invention.
Figure 10:
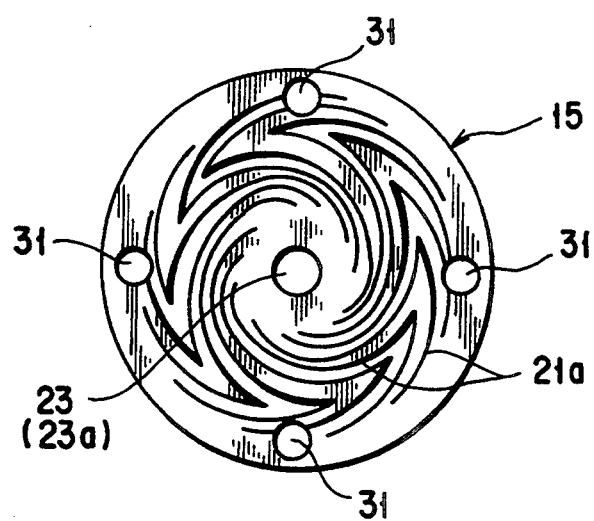
FIG. 10 is a top view showing a main portion of the rotary anode type X-ray tube in FIG. 9.

In the case of a still further embodiment shown in FIGS. 9 and 10, four recesses 31 are formed on the top of the stationary structure 15 along the outer ends of the spiral grooves 21a of the thrust slide bearing 22a. In short, they are located at that area of the top of the stationary structure 15 where the circle-like herringbone pattern spiral grooves 21a are present and where the lubricant becomes less when the X-ray tube is under operation. They have a depth 50 times larger than that of the spiral grooves and they reserves the lubricant therein. When the rotary structure 12 starts its rotation or it is being rotated, therefore, the lubricant in them flows in the spiral grooves and on the bearing face of the thrust slide bearing and also supplied into the gap between the stationary and the rotary structure. Supplied to the inner area of the circle-like herringbone pattern spiral grooves 21a is the lubricant through the opening 23a of the lubricant chamber 23. It is comparatively easy to form the recesses 31 on the top of the stationary structure.

Same recesses may be formed adjacent to the outer ends of the spiral grooves of each radial slide bearing.

Figure 11:
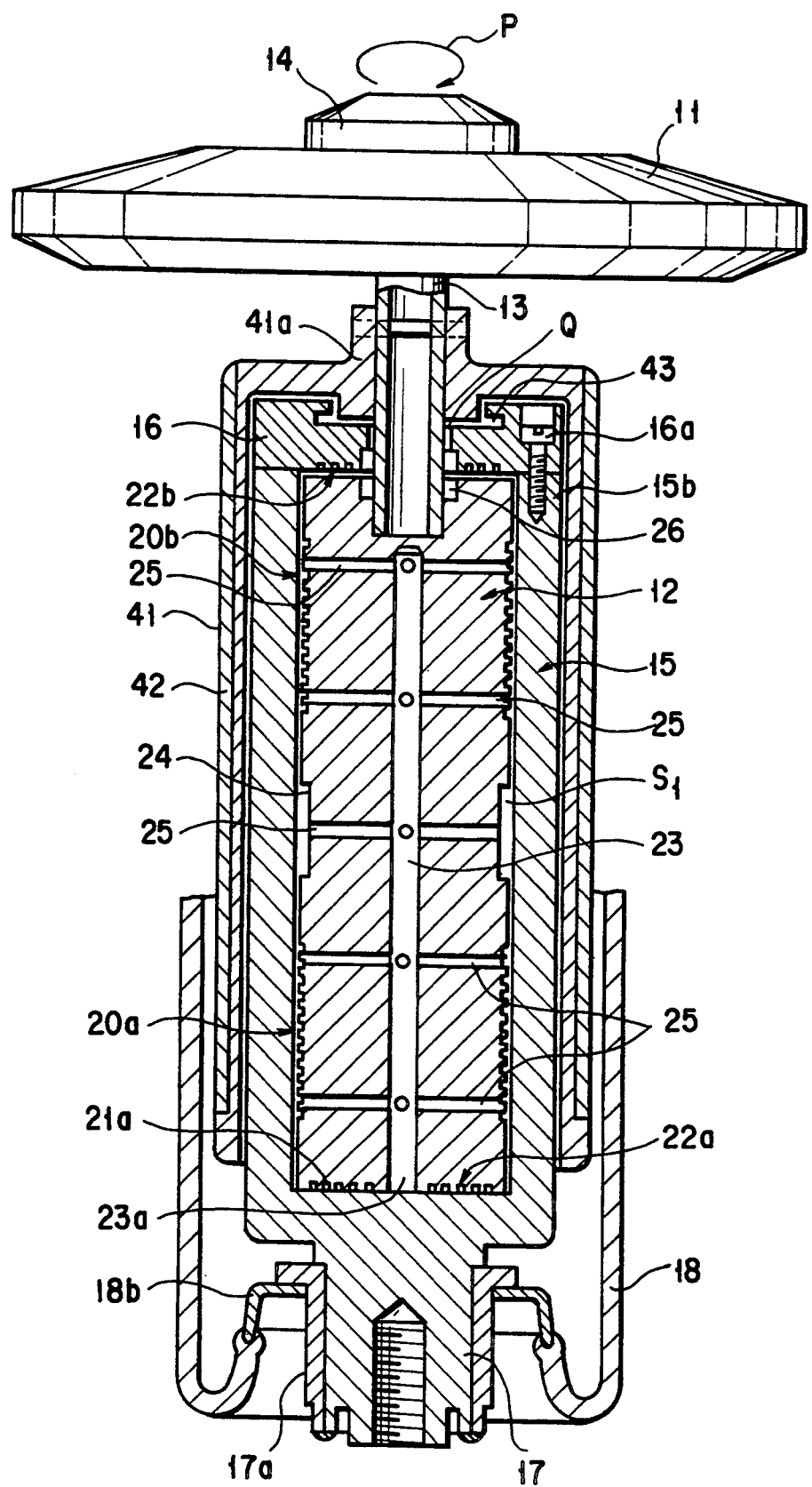
FIG. 11 is a vertically-sectioned view showing the X-ray tube of the rotary anode type according to a still further embodiment of the present invention.

In the case of the above-described embodiments, their anode target is fixed to the cylindrical rotary structure. As shown in FIG. 11, however, the present invention can be applied to an X-ray tube of the rotary anode type wherein the column-like rotary structure 12 to which the anode target is connected is arranged along the rotating center axis. More specifically, the rotating shaft 13 is fixed to the top of the column-like rotary structure 12 and the anode target 11 is fixed to the free end of the rotating shaft 13. The cylindrical bottomed stationary structure 15 encloses the rotary structure 12. The closing member 16 is attached to an open top 15b of the stationary structure 15 by plural bolts 16a. A ferromagnetic cylinder 41 which serves as the rotor cylinder for the motor encloses the stationary structure 15 and a copper-made cylinder 42 is coaxially fitted onto the ferromagnetic cylinder 41. A top end portion 41a of the cylinder 41 is strongly and mechanically fixed to the rotating shaft 13. The closing member 16 contacts the top of the rotary structure 12 and spiral grooves 21 are formed on this contacted face of the closing member 16. Those portions of the closing member 16 and the rotary structure 12 which are adjacent to the rotating shaft 13 are cut away to form a ring-shaped space 26, which is communicated with the inner end of the gap between the top of the rotary structure 12 and the thrust bearing-provided face of the closing member 16. A slight clearance Q and a recess 43 extending in the radial direction which serve to prevent the lubricant from being leaked are formed on the way of a passage extending from the space 26 to the inside space in the vacuum envelope through an interval between the stationary structure 15 and the ferromagnetic cylinder 41. The lubricant may adhere to the inner face of the folded recess 43 to react with it and form a film on it. Even if a part of the lubricant is leaked to the folded recess 43, therefore, it adheres to the inner face of the recess 43 and it can be thus prevented from further leaking toward the inside space in the vacuum envelope.

The lubricant housing chamber 23 is formed, as a hole, in the rotary structure 12 along the center axis thereof. Its lower end opening 23a is located in the center of the circle-like spiral grooves 21a of the thrust bearing 22a, which is formed on the bottom of the rotary structure 12, and communicated with the interval between the thrust bearing-provided face of the rotary structure 12 and the inner face of the stationary structure 15. The radial passages 25 are extended from the lubricant housing chamber 23 and opened adjacent to both ends of herringbone pattern spiral grooves 19a or 19b of the radial slide bearing 20a or 20b. The lubricant can be thus reliably supplied to the slide bearings 20a and 20b. Recesses shown in FIGS. 9 and 10 may be formed in those areas where the spiral grooves of the radial bearings are present. When arranged in this manner, only those radial passages 25 which are opened at the small-diameter portion 24 of the rotary structure 12 can be used. A reaction layer of the bearing material and the lubricant may be previously formed thin at least on the grooves-provided slide bearing face of each bearing component member. Or the reaction layer may be formed thin on each bearing face by the vacuum heating process. It is preferable in this case that an amount of the lubricant which is used to form the reaction layers is added to the lubricant filled.

Ga, Ga-In and Ga-In-Sn alloys whose main component is Ga can be used as the metal lubricant. In addition, Bi-In-Pb-Sn alloy whose main component is bismuth, In-Bi and In-Bi-Sn alloys whose main component is indium can also be used is the metal lubricant. Their melting points are higher than room temperature. It is therefore preferable that the anode target is rotated after they are pre-heated higher than their melting points.

According to the present invention is described above, the liquid metal lubricant can be more reliably supplied to the bearing face of each slide bearing even when the rotary structure starts its rotation or it is being rotated at high speed. The bearing faces can be thus prevented from being damaged and the operation of the dynamic pressure type slide bearings can be kept more stable.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An X-ray tube of the rotary anode type comprising:
   an anode target;
   a rotary structure to which said anode target is fixed, said rotary structure having a center axis and a rotary bearing surface region;
   a stationary structure for rotatably supporting said rotary structure, said stationary structure having a stationary bearing surface region opposed to said rotary bearing surface region;
   slide bearing sections of a hydrodynamic pressure type, said slide bearing sections including grooves formed on at least one of said rotary and stationary surface regions and arranged as a herringbone pattern to define a herringbone pattern area;
   a metal lubricant applied to said bearing sections which is in a liquid state when said X-ray tube is stably operated; and
   means for receiving said lubricant, said receiving means including a recess for receiving said lubricant formed in one of said stationary and rotary structures and being opened in a peripheral side of said herringbone pattern area.

2. The X-ray tube of the rotary anode type according to claim 11, wherein said spiral grooves are arranged as a herringbone pattern around said center axis, each pair of said grooves extending from a center area to both side areas in said one of said rotary and stationary bearing surface regions.

3. The X-ray tube of the rotary anode type according to claim 1, wherein said spiral grooves are arranged as a herringbone pattern around said center axis, each pair of said grooves having different lengths and extending from a center area to both side areas in said one of said rotary and stationary bearing surface regions.

4. The X-ray tube of the rotary anode type according to claim 1, wherein said spiral grooves are arranged as a herringbone pattern around said center axis, each pair of said grooves having different lengths and extending from a center area to both side areas in said one of said rotary and stationary bearing surface regions.

5. The X-ray tube of the rotary anode type comprising:
   an anode target;
   a rotary structure to which said anode target is fixed, said rotary structure having a center axis and a rotary bearing surface region;
   a stationary structure for rotatably supporting said rotary structure, said stationary structure having a stationary bearing surface region opposed to said rotary bearing surface region;
   slide bearing sections of a hydro-dynamic pressure type, said slide bearing sections including spiral grooves formed on at least one of said rotary and stationary bearing surface regions and a gearing gap between said rotary and stationary structures, said spiral grooves being arranged as a herringbone pattern around said center axis, each pair of said grooves having different lengths and extending from a center area to both side areas in said one of said rotary and stationary bearing surface regions;

a metal lubricant applied to said slide bearing sections which is in a liquid state when said X-ray tube is stably operated; and means for receiving said lubricant, said receiving means including a chamber formed in one of said stationary and rotary structures and at least one lubricant passage formed in said one of said stationary and rotary structures, said receiving means having one end opened in said chamber and another end opened in one of said rotary and stationary bearing surface regions.

6. The X-ray tube of the rotary anode type comprising:

an anode target;

a rotary structure to which said anode target is fixed, said rotary structure having a center axis and a rotary bearing surface region;

a stationary structure for rotatably supporting said rotary structure, said stationary structure having a stationary bearing surface region opposed to said rotary bearing surface region;

slide bearing sections of a hydro-dynamic pressure type, said slide bearing sections including spiral grooves formed on at least one of said rotary and stationary bearing surface regions and a gearing gap between said rotary and stationary structures, said spiral grooves being arranged as a herringbone pattern around said center axis, each pair of said grooves having different lengths and extending from a center area to both side areas in said one of said rotary and stationary bearing surface regions;

a metal lubricant applied to said slide bearing sections Which is in a liquid state when said X-ray tube is stably operated; and means for receiving said lubricant, said receiving means including a recess formed in one of said rotary and stationary bearing surface regions.

7. An X-ray tube of the rotary anode type comprising:

an anode target;

a rotary structure to which said anode target is fixed, said rotary structure having a center axis and a rotary bearing surface region;

a stationary structure for rotatably supporting said rotary structure, said stationary structure having a stationary bearing surface region opposed to said rotary bearing surface region;

slide bearing sections of a hydrodynamic pressure type, said slide bearing sections including grooves formed on at least one of said rotary and stationary surface regions and arranged as a herringbone pattern to define a herringbone pattern area;

a metal lubricant applied to said bearing sections which is in a liquid state when said X-ray tube is stably operated; and means for receiving said lubricant, said receiving means including a chamber formed in one of said stationary and rotary structures and at least one lubricant passage formed and radially extending in said one of said stationary and rotary structures and having one end opened in said chamber and said other end opened in a peripheral side of said herringbone pattern area.

8. The X-ray tube of the rotary anode type according to claim 7, wherein said spiral grooves are arranged as a herringbone pattern around said center axis, each pair of said grooves extending from a center area to both side areas in said one of said rotary and stationary bearing surface regions, and said other end of said passage being opened at one of said side areas.

9. The X-ray tube of the rotary anode type according to claim 7, wherein said spiral grooves are arranged as a herringbone pattern around said center axis, each pair of said grooves having different lengths and extending from a center area to both side areas in said one of said rotary and stationary bearing surface regions.

10. The X-ray tube of the rotary anode type according to claim 7, wherein said spiral grooves are arranged as a herringbone pattern around said center axis, each pair of said grooves having different lengths and extending from a center area to both side areas in said one of said rotary and stationary bearing surface regions, and said other end of said passage being opened at one of said side areas.

* * * * *

UNITED STATES PATENT AND TRADEMARK OFFICE
CERTIFICATE OF CORRECTION

PATENT NO.    :    5,384,819
DATED         :    January 24, 1995
INVENTOR(S)   :    Katsuhiro ONO It is certified that error appears in the above-identified patent and that said Letters Patent is hereby corrected as shown below:

ON THE COVER PAGE:

Item [30]:
    "Apr. 8, 1992   [JP]   Japan................ 4-114263"

Should read:
    --Apr. 8, 1992   [JP]   Japan................ 4-114273--

Signed and Sealed this

Thirtieth Day of May, 1995

*Attest:*

BRUCE LEHMAN

*Attesting Officer*    *Commissioner of Patents and Trademarks*